United States Patent Office 3,238,195
Patented Mar. 1, 1966

3,238,195
ACETAL AND KETAL DERIVATIVES OF 5-BROMO-PROGESTERONE COMPOUNDS
Patrick A. Diassi, Westfield, N.J., assignor to Olin Mathieson Chemical Corporation, New York, N.Y., a corporation of Virginia
No Drawing. Filed Mar. 12, 1963, Ser. No. 264,688
6 Claims. (Cl. 260—239.55)

This invention relates to and has for its object the provision of new physiologically active steroids, methods for preparing the same, and new intermediates useful in said preparation.

The final products of this invention can be represented by the formula

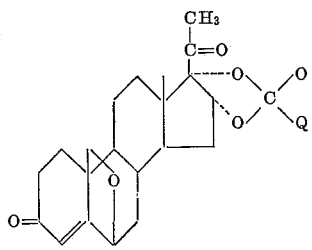

wherein P is hydrogen, lower alkyl, halo lower alkyl, carboxy lower alkyl (or a salt or ester therof), monocyclic cycloalkyl, monocyclic aryl, monocyclic aryl lower alkyl, monocyclic heterocyclic or monocyclic heterocyclic lower alkyl; Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl or together with the carbon atom to which they are joined P and Q are cycloalkyl or monocyclic heterocyclic.

The compounds of this invention may be prepared by the processes of this invention as illustrated by the following equations wherein P and Q are as hereinbefore defined and R and R' represent hydrogen or acyl.

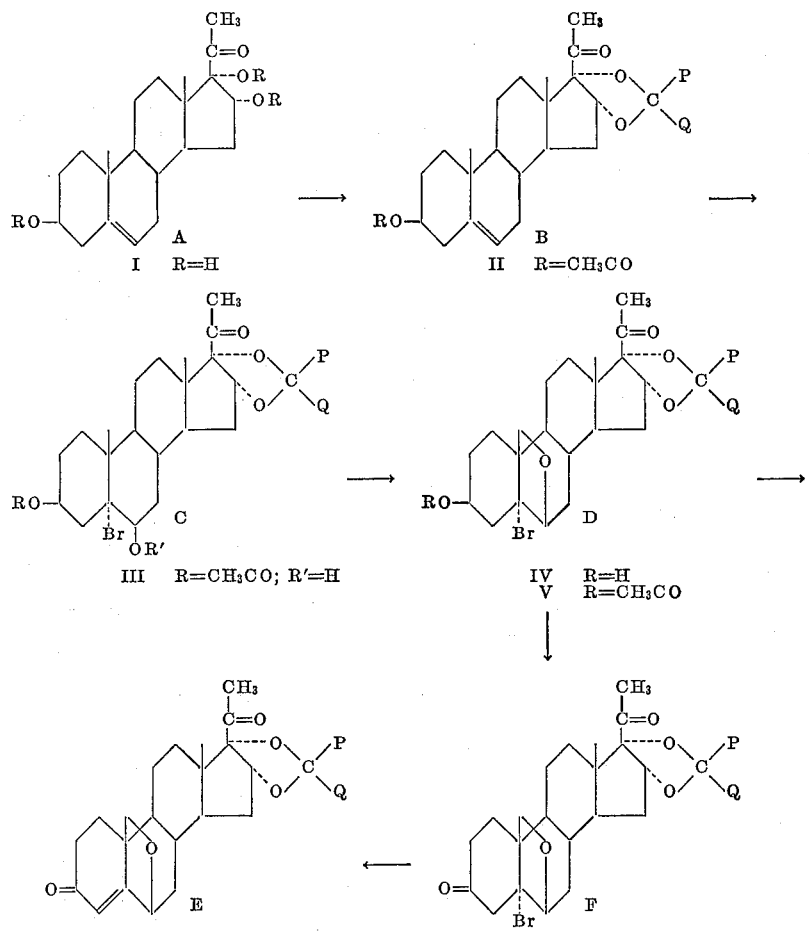

The compounds of this invention are prepared by first interacting $\Delta^5$-pregnene - $3\beta,16\alpha,17\alpha$ - triol-20-one (Compounds A) with an aldehyde or ketone of the formula $$O=C\diagup^{P}_{\diagdown Q}$$

wherein P and Q are as above-defined, and recovering the resultant acetal or ketal derivative. The reaction is preferably carried out by treating a suspension or solution of the steroid in the aldehyde or ketone (or an organic solvent if the aldehyde or ketone is a solid) with an acid catalyst (e.g. perchloric acid, p-toluenesulfonic acid, hydrochloric acid, etc.) and neutralizing the acid.

Suitable aldehyde and ketone reactants include lower alkanals of at least two carbon atoms, such as paraldehyde, propanal, and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclodexanone; mono and dicycloalkyl ketones, such as cyclohexylmethylketone and dicyclopropylketone, halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)-benzaldehydes (e.g., veratraldehyde), hydroxybenzaldehydes (e.g. salicylaldehyde), dihydroxybenzaldehydes (e.g. resorcylaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carbocyclic aromatic lower alkanals, such as phenylacetaldehyde, α-phenylpropionaldehyde, β-phenylpropionaldehyde, λ-phenylbutyraldehyde, and aromatically substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy lower alkyl, nitro, and cyano derivatives thereof; monocyclic heterocyclic lower alkanals; 1-(monocyclic carbocyclic aromatic) substituted lower alkanals, such as acetophenone, α,α,α-trifluoroacetophenone, propiophenone, butyrophenone, valerophenone, isocaprophenone, halophenyl lower alkyl ketones (e.g. p-chloroactophenone and p-chloropropiophenone), (lower alkoxy)phenyl lower alkyl ketones (e.g. p-anisyl methyl ketone), di(-lower alkoxy)phenyl lower alkyl ketones, hydroxy-phenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)-phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; 1-(monocyclic heterocyclic) substituted lower alkanols, such as 2-acetylfuran, 2-benzoylfuran, and 2-acetyl-thiophenone; oxo substituted monocyclic heterocyclics, such as alloxan; monocyclic heterocyclic lower alkanones; and oxo lower alkanoic acids such as glyoxylic, pyruvic, actoacetic, β-ketopropionic, α-ketobutyric, levulinic, β-ketocaproic and β-ketocaprylic acid [as well as salts and esters thereof, such as the lower alkyl esters (e.g. methyl and ethyl)].

The resultant product may then be converted to its 3-ester derivative in the usual manner by reacting with the desired acylating agent (e.g. acyl chloride or acid anhydride) in the process of a base, such as pyridine to yield Compounds B. Although any ester can be prepared, the preferred esters are those with hydrocarbon carboxylic acids with less than 12 carbon atoms as exemplified by the lower alkanoic acids (e.g. acetic, propionic, butyric, tert-pentanoic acid), lower alkenoic acids, the monocyclic aryl carbocyclic acids (e.g. benzoic and toluic acids), aryl lower alkanoic acids (e.g. phenacetic and β-phenylpropionic acid), the cycloalkane carboxylic acids and the cycloalkene carboxylic acids.

The 3-ester compounds thus obtained, are then treated with N-bromoacetamide, in an acid medium, to yield the 3-esters of the 16α,17α-ketal or acetal derivatives of 5α-bromopregnane-3β,6β,16α,17α-tetrol-20-one (Compounds C) which are also new compounds of this invention.

The 3-ester of the 16α,17α-ketal or acetal derivatives of 5α-bromopregnane-3β,6β,16α,17α-tetrol-20-one are then oxidized as by treatment with lead tetraacetate or with iodine and lead tetraacetate to yield the 3-ester of the 16α,17α-acetal or ketal derivatives of 5α-bromo-6β,-19 - oxidopregnane-3β,16α,17α-triol-20-one (Compounds D) which are also new compounds of this invention.

These compounds are then hydrolyzed by treatment with a base such as carbonate to obtain the 16α,17α-ketal or acetal derivatives of 5α-bromo-6β,19-oxidopregnane-3β,16α,17α-triol-20-one (Compound D, wherein R is H) which are also new compounds of this invention.

The 16α,17α-ketal and acetal derivatives of 5α-bromo-6β,19-oxidopregnane-3β,16α,17α - triol - 20-one (Compounds D) are then oxidized and dehydrobrominated in one step as by treatment with chromic anhydride and sulfuric acid to yield the 16α,17α-ketal and acetal derivatives of 6β,19-oxidoprogesterone (Compounds E) which are also new compounds of this invention.

Alternately the 16α,17α-ketal and acetal derivatives of 5α-bromo-6β,19-oxidopregnane-3β,16α,17α-triol-20-one can be oxidized to the 16α,17α-ketal and acetal derivatives of 5α-bromo-6β,19-oxidopregnane-16α,17α-diol-3,20-dione (Compound F) which are also new compounds of this invention. Dehydrobromination of these latter compounds with a base such as potassium acetate in an appropriate solvent such as ethanol yield the 16α,17α-ketal and acetal derivatives of 6β,19-oxidoprogesterone.

The compounds of this invention are physiologically active substances which possess progestational activity when administered both on the form of tablets and as a solution or suspension and hence can be used in lieu of known progestational agents such as progesterone in the treatment of habitual abortion for which purpose they can be administered in the same manner as progesterone, for example, the dosage being adjusted for the relative potency of the particular steroid.

The following examples are illustrative of the invention (all temperatures being in centigrade):

EXAMPLE 1

*16α,17α-(β-methyl-α-phenylmethylenedioxy-Δ⁵-pregnene-3β-ol-20-one 3-acetate*

To a solution of 0.5 ml. of 70% perchloric acid in 100 ml. of freshly distilled acetophenone 10 g. of $\Delta^5$-pregnene-3β,16α,17α-triol-20-one are added and the mixture stirred at room temperature for two hours. The solution is filtered from the small amount of insoluble material then neutralized with dilute sodium bicarbonate diluted with water and extracted with chloroform. The chloroform is washed with water, dried over sodium sulfate and evaporated to dryness, in vacuo. The residue is dissolved in 30 ml. of pyridine and 10 ml. of acetic anhydride and left at room temperature overnight. The acetic anhydride is decomposed with ice and the mixture distributed between chloroform and water. The chloroform is washed successively with 2 N HCl, 5% NaHCO₃ and water and then evaporated to dryness in vacuo. Crystallizatton of the residue from acetone-hexane gives 7.0 g. of 16α,17α(β-methyl-α-phenylmethylenedioxy)-$\Delta^5$-pregnene-3β-ol-20-one 3-acetate having a melting point of about 179–181°, $[\alpha]_D^{22}$—47° (chloroform).

EXAMPLE 2

*5α-bromo-16α,17α-dimethylmethylenedioxypregnane-3β-6β-diol-20-one 3-acetate*

To a solution of 700 mg. of 16α,17α-dimethylmethylenedioxy-$\Delta^5$-pregnene-3β-ol-20-one 3-acetate in 16.5 ml. of dioxane containing 2.4 ml. of 0.5 M perchloric acid 440 mg. of N-bromoacetamide are added and the resulting solution kept in the dark at room temperature for two hours during which time it turns amber in color. A 5% solution of sodium sulfite is then added until the solution turns colorless. It is then diluted with 20 ml. of water and extracted with chloroform. The chloroform extracts are washed with water then evaporated to dryness in vacuo. Crystallization of the residue from acetone-hexane gives 500 mg. of 5α-bromo-16α,17α-dimethylmethylenedioxypregnane-3β,6β-diol-20-one 3-actate having a M.P. of about 158–160°, $[\alpha]_D^{22}$ −3.4° (chloroform).

*Analysis.*—Calcd. for $C_{26}H_{39}O_6Br$ (527.49); C, 59.20; H, 7.45; Br, 15.15. Found: C, 59.93; H, 7.32; Br, 15.46.

EXAMPLE 3

*5α-bromo-16α,17α-(β-methyl-α-phenylmethylenedioxy)-pregnane-3β,6β-diol-20-one 3-acetate*

Following the procedure described in Example 2 but substituting 16α,17α(β-methyl-α-phenylmethylenedioxy)-Δ⁵-pregnene-3β-ol-20-one 3-acetate for 16α,17α-dimethylmethylenedioxy-Δ⁵-pregnene-3β-ol-20-one 3-acetate there is obtained 5α-bromo-16α,17α-(β-methyl-α-phenylmethylenedioxy)-pregnane-3β,6β-diol-20-one 3-acetate having a M.P. of about 184–186°, $[\alpha]_D^{22}$ −34° (chloroform).

*Analysis.*—Calcd. for $C_{31}H_{41}O_6Br$ (589.56): C, 63.15; H, 7.01; Br, 13.55. Found: C, 63.21; H, 7.08; Br, 13.83.

EXAMPLE 4

*5α-bromo-6β,19-oxido-16α,17α-dimethylmethylenedioxypregnane-3β-ol-20-one 3-acetate*

A mixture of 870 mg. of lead tetraacetate which has been dried under high vacuum over potassium hydroxide for several hours and 260 mg. of calcium carbonate which has been dried over phosphorous pentoxide in 75 ml. of cyclohexane is refluxed for fifteen minutes. Eight hundred and fifty-seven milligrams of 5α-bromo-16α,17α-dimethylmethylenedioxypregnane-3β,6β-diol-20-one 3-acetate is then added and the mixture refluxed for sixteen hours. The mixture is then filtered and washed successively with 50 ml. portions of methylene chloride and ethyl acetate. The combined filtrates are then washed with 100 ml. of 5% potassium iodide followed by 100 ml. of 10% sodium sulfite. The organic phase is then washed twice with water dried over sodium sulfate and evaporated to dryness in vacuo. Crystallization of the residue from methanol gives 225 mg. of 5α-bromo-6β,19-oxido-16α,17α-dimethylmethylenedioxypregnane-3β-ol-20-one 3-acetate having a M.P. of about 203–205°, $[\alpha]_D^{22}$ +26.2° (chloroform).

*Analysis.*—Calcd. for $C_{26}H_{37}O_6Br$ (525.48): C, 59.42; H, 7.10. Found: C, 59.51; H, 7.15.

EXAMPLE 5

*5α-bromo-6β,19-oxido-16α,17α-(β-methyl-α-phenylmethylenedioxy)-pregnane-3β-ol-20-one 3-acetate*

Following the procedure described in Example 4 but substituting 5α-bromo-16α,17α-(β-methyl-α-phenylmethylenedioxy)-pregnane-3β,6β-diol-20-one 3-acetate for the 5α-bromo-16α,17α-dimethylmethylenedioxypregnane-3β,6β-diol-20-one 3 acetate there is obtained 5α-bromo-6β,19-oxido-16α,17α-(β-methyl-α-phenylmethylenedioxy)-pregnane-3β-ol-20-one 3-acetate having a M.P. of about 225–227°, $[\alpha]_D^{22}$ +5.0° (chloroform).

*Analysis.*—Calcd. for $C_{31}H_{39}O_6Br$ (587.55): C, 63.37; H, 6.69; Br, 13.60. Found: C, 63.41; H, 6.59; Br, 13.79.

EXAMPLE 6

*5α-bromo-6β,19-oxido-16α,17α-dimethylmethylenedioxypregnane-3β-ol-20-one*

To a solution of 1 ml. of 10% potassium carbonate in 7 ml. of methanol 100 mg. of 5α-bromo-6α,19-oxido-16α,17α-dimethylmethylenedioxypregnane-3β-ol-20-one 3-acetate are added and the mixture stirred at room temperature for sixteen hours. The solution is neutralized with 10% acetic acid and slowly diluted with water whereupon the 5α-bromo-6β,19-oxido-16α,17α-dimethylmethylenedioxypregnane-3β-ol-20-one crystallizes. It is filtered, washed with water and dried to give 58 mg. having a M.P. of about 248–250°, $[\alpha]_D^{22}$ +19.3° (chloroform).

*Analysis.*—Calcd. for $C_{24}H_{35}O_5Br$ (483.44); C, 59.62; H, 7.30. Found: C, 59.44; H, 7.48.

EXAMPLE 7

*5α-bromo-6β,19-oxido-16α,17α-(β-methyl-α-phenylmethylenedioxy)-pregnane-3β-ol-20-one*

Following the procedure described in Example 6 but substituting 5α-bromo-6β,19-oxido-16α,17α-(β-methyl-α-phenylmethylenedioxy)-pregnane-3β-ol-20-one 3-acetate for 5α-bromo-6β,19-oxido-16α,17α-dimethylmethylenedioxypregnane-3β-ol-20-one 3-acetate there is obtained 5α-bromo-6β,19-oxido-16α,17α-(β-methyl-α-phenylmethylenedioxy)-pregnane-3β-ol-20-one having a melting point of about 155–157°.

EXAMPLE 8

*5α-bromo-6β,19-oxido-16α,17α-dimethylmethylenedioxypregnane-3,20-dione*

To a stirred solution of 26.3 mg. of 5α-bromo-6β,19-oxido-16α,17α-dimethylmethylenedioxypregnane-3β-ol-20-one in 2 ml. of reagent grade acetone is added dropwise 0.21 ml. of a solution containing 200 mg. of chromic anhydride and 320 mg. of sulfuric acid in 9 ml. of reagent grade acetone and 1 ml. of water. After five minutes the excess oxidizing agent is decomposed with a few drops of methanol and filtered. The filtrate is carefully diluted with water to give a crystalline precipitate of 5α-bromo-6β,19-oxido-16α,17α-dimethylmethylenedioxypregnane-3,20-dione which is filtered, washed with water and dried. Melting point about 117–130° (decomposition).

EXAMPLE 9

*5α-bromo-6β,19-oxido-16α,17α-(β-methyl-α-phenylmethylenedioxy)-pregnane-3,20-dione*

Following the procedure of Example 8 but substituting 5α-bromo-6β(19-oxido-16α,17α-(β-methyl-α-phenylmethylenedioxy)-pregnane-3β-ol-20-one for 5α-bromo-6β(19-oxido-16α,17α-dimethylmethylenedioxypregnane - 3β - ol-20-one there is obtained 5α-bromo-6β,19-oxido-16α,17α-(β-methyl-α-phenylmethylenedioxy)-pregnane-3,20-dione having melting point about 142–144° (decomposition).

EXAMPLE 10

*6β,19-oxido-16α,17α-dimethylmethylenedioxyprogesterone*

To a solution of 169 mg. of 5α-bromo-6β,19-oxido-16α,17α-dimethylmethylenedioxypregnane-3β-ol-20-one in 10 ml. of reagent grade acetone, 1.55 ml. of a solution containing 200 mg. of chromic anhydride and 320 mg. of sulfuric acid in a mixture of 9 ml. of reagent grade acetone and 1 ml. of water are added dropwise. After 20 minutes the excess oxidizing agent is decomposed with methanol, the mixture centrifuged and the organic phase distributed between chloroform and water. The chloroform is separated and evaporated to dryness in vacuo with heat. Crystallization of the residue from acetone-hexane gives 6β,19 - oxido - 16α,17α - dimethylmethylenedioxyprogesterone having a M.P. of about 213–214°, $[\alpha]_D^{22}$ −46.1° (chloroform);

$$\lambda_{max.}^{alc.}\ 237\ m\mu\ (\epsilon=13,800)$$

*Analysis.*—Calcd. for $C_{24}H_{32}O_5$ (400.50); C, 71.97; H, 8.05. Found: C, 71.72; H, 8.32.

EXAMPLE 11

*6β,19-oxido-16α,17α-(β-methyl-α-phenylmethylenedioxy)-progesterone*

Following the procedure described in Example 8 but substituting 5α-bromo-6β,19-oxido-16α,17α-(β-methyl-α-phenylmethylenedioxy)-pregnane-3β-ol-20-one for 5α-bromo - 6β,19 - oxido - 16α,17α - dimethylmethylenedioxypregnane-3β-ol-20-one there is obtained 6β,19-oxido - 16α,17α - (β - methyl - α - phenylmethylenedioxy)-progesterone having melting point about 140–142°, $[\alpha]_D^{22}$ −57° (chloroform), $$\lambda_{max.}^{alc.}\ 241\ m\mu\ (12,800)$$

*Analysis.*—Calcd. for $C_{29}H_{34}O_5$ (462.53): C, 75.30; H, 7.41. Found: C, 75.24; H, 7.52.

EXAMPLE 12

*p-Nitroacetophenone derivative of 6β,19-oxido-16α,17α-dihydroxyprogesterone*

(A) Following the procedure of Example 1 but substituting p-nitroacetophenone for acetophenone yields the 16α,17α-nitroacetophenone derivative of $\Delta^5$-pregnene-3β-ol-20-one-3-acetate.

(B) Following the procedure set forth in Examples 2, 4, 6 and 10 but employing the nitroacetophenone derivative obtained in Example 12 part (A), yields the nitroacetophenone derivative of 6β,19-oxido-16α,17α-dihydroxyprogesterone.

EXAMPLE 13

*Benzaldehyde derivative of 6β,19-oxido-16α,17α-dihydroxyprogesterone*

Following the procedure set forth in Example 12, parts (A) and (B) but substituting 15 ml. of benzaldehyde for the p-nitroacetophenone of Example 12, part (A), yields the benzaldehyde derivative of 6β,19-oxido-16α,17α-dihydroxyprogesterone.

EXAMPLE 14

*Furfural derivative of 6β,19-oxido-16α,17α-dihydroxyprogesterone*

Following the procedure set forth in Example 12, parts (A) and (B), but substituting furfural for the p-nitroacetophenone of Example 12, part (A), yields the furfural derivative of 6β,19-oxido-16α,17α-dihydroxyprogesterone.

EXAMPLE 15

*p-Chloro acetophenone derivative of 6β,19-oxido-16α,17α-dihydroxyprogesterone*

Following the procedure of Example 12 parts (A) and (B), but substituting p-chloro acetophenone for p-nitro acetophenone of Example 12, part (A), yields the p-chloro acetophenone derivative of 16α,17α-dihydroxyprogesterone.

EXAMPLE 16

*5α-bromo-6β,19-oxido-16α,17α-dimethylmethylenedioxypregnane-3β-ol-20-one-3-acetate*

A mixture of 8.0 g. of lead tetraacetate which has been dried under high vacuum over potassium hydroxide for several hours and 2.6 g. of calcium carbonate which had been dried over phosphorous pentoxide in 100 ml. of cyclohexane are refluxed with stirring for fifteen minutes. A solution of 2.0 g. of 5α-bromo-16α,17α-dimethylmethylenedioxypregnane - 3β,6β - diol - 20 - one 3-acetate in 75 ml. of dry benzene is then added followed by 2.24 g. of iodine. The mixture is stirred under reflux for 2.5 hours during which time the mixture is irradiated with a 250 watt lamp. The mixture is then filtered and washed successively with 50 ml. portions of methylene chloride and ethyl acetate. The combined filtrates are washed with 100 ml. of 5% potassium iodide followed by 100 ml. of 10% sodium sulfite. The organic phase is then washed twice with water, dried over sodium sulfate and evaporated to dryness, in vacuo. Crystallization of the residue from methanol gives 1.5 g. of 5α-bromo-6β,19 - oxido - 16α,17α - dimethylmethylenedioxypregnane-3β-ol-20-one 3-acetate.

EXAMPLE 17

*5α-bromo-6β,19-oxido-16α17α(β-methyl-α-phenylmethylenedioxy)-pregnane-3β-ol-20-one-3-acetate*

Following the procedure of Example 16 but substituting 5α-bromo-16α,17α-(β-methyl - α - phenylmethylenedioxy)-pregnane-3β,6β-diol-20-one 3-acetate for the 5α-bromo - 16α,17α - dimethyl - methylenedioxypregnane-3β,6β-diol-20-one 3-acetate there is obtained 5α-bromo-6β,19-oxido-16α,17α-(β - methyl - α - phenylmethylenedioxy)pregnane-3β-ol-20-one-3-acetate.

EXAMPLE 18

*6β,19-oxido-16α,17α-dimethylmethylenedioxyprogesterone*

A solution of 50 mg. of 5α-bromo-6β,19-oxido-16α,17α-dimethylmethylenedioxypregnane-3,20-dione and 50 mg. of potassium acetate in 5 ml. of absolute ethanol are warmed at 60° C. for two hours. The solution is then cooled, diluted with water and extracted with chloroform. The chloroform phase is separated, washed with water and evaporated to dryness in vacuo. Crystallization of the residue from acetone-hexane gives 6β,19-oxido-16α,17α-dimethylmethylenedioxyprogesterone.

EXAMPLE 19

*6β,19-oxido-16α,17α(β-methyl-α-phenylmethylenedioxy) progesterone*

Following the procedure of Example 11 but substituting 5α - bromo - 6β,19 - oxido - 16α,17α(β - methyl-α-phenylmethylenedioxy)-pregnane-3,20-dione for 5α-bromo-6β,19-oxido-16α,17α-dimethylmethylenedioxypregnane-3,20-dione there is obtained 6β,19-oxido-16α,17α-(β-methyl-α-phenylmethylenedioxy)progesterone.

EXAMPLE 20

*Benzophenone derivative of 6β,19-oxido-16α,17α-dihydroxyprogesterone*

Following the procedure set forth in Example 12, parts (A) and (B), but substituting benzophenone for the p-nitroacetophenone of Example 12, part (A) yields benzophenone derivative of 6β,19-oxido-16α,17α-dihydroxyprogesterone.

EXAMPLE 21

*2-acetyl furan derivative of 6β,19-oxido-16,17α-dihydroxyprogesterone*

Following the procedure set forth in Example 12, parts (A) and (B) but substituting 2-acetyl furan for p-nitro acetophenone of Example 12, part (A) yields 2-acetyl furan derivative of 6β,19-oxido-16α,17α-dihydroxyprogesterone.

EXAMPLE 22

*Cyclohexylene derivative of 6β,19-oxido-16α,17α-dihydroxyprogesterone*

Following the procedure set forth in Example 12, parts (A) and (B) but substituting cyclohexanone for the p-nitroacetophenone of Example 12, part (A) yields cyclohexylene derivative of 6β,19-oxido-16α,17α-dihydroxyprogesterone.

This invention may be variously embodied within the scope of the appended claims.

What is claimed is:

1. A steroid of the formula wherein P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon atom to which they are joined P and Q are selected from the group consisting of cycloalkyl and monocyclic heterocyclic; R is hydrogen and R' is selected from the group consisting of hydroxy and acyloxy, wherein the acyl radical is from a hydrocarbon carboxylic acid of less than 12 carbon atoms, and together R and R' is oxo.

2. A steroid of the formula

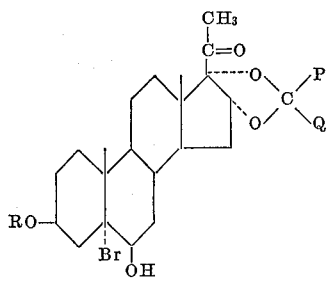

wherein R is selected from the group consisting of hydrogen and the acyl radical of a hydrocarbon carboxylic acid of less than 12 carbon atoms and P is selected from the group consisting of hydrogen, lower alkyl, halo lower alkyl, carboxy lower alkyl, monocyclic cycloalkyl, monocyclic aryl, monocyclic aryl lower alkyl, monocylic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon atom to which they are joined P and Q are selected from the group consisting of cycloalkyl and monocyclic heterocyclic.

3. $5\alpha$ - bromo - $16\alpha,17\alpha$ - dimethylmethylenedioxypregnane-$3\beta,6\beta$-diol-20-one 3-acetate.

4. $5\alpha$-bromo-$16\alpha,17\alpha$-($\beta$ - methyl - $\alpha$ - phenylmethylenedioxy)pregnane-$3\beta,6\beta$-diol-20-one 3-acetate.

5. $5\alpha$ - bromo - $6\beta,19$ - oxido - $16\alpha,17\alpha$ - ($\beta$-methyl-$\alpha$-phenylmethylenedioxy)pregnane-$3\beta$-ol-20-one 3-acetate.

6. $5\alpha$ - bromo - $6\beta,19$ - oxido - $16\alpha,17\alpha$ - ($\beta$ - methyl - $\alpha$-phenylmethylenedioxy)pregnane-$3\beta$-ol-20-one.

No references cited.

LEWIS GOTTS, *Primary Examiner.*

HENRY A. FRENCH, *Assistant Examiner.*